Nov. 28, 1939.  W. G. BRUCE  2,181,595
FLY TRAP
Filed Dec. 6, 1938   2 Sheets-Sheet 1

Inventor
W. G. BRUCE

Nov. 28, 1939.   W. G. BRUCE   2,181,595
FLY TRAP
Filed Dec. 6, 1938   2 Sheets-Sheet 2

Inventor
W. G. BRUCE

Patented Nov. 28, 1939

2,181,595

UNITED STATES PATENT OFFICE 2,181,595

FLY TRAP

Wesley Gordon Bruce, Dallas, Tex., dedicated to the free use of the People in the territory of the United States Application December 6, 1938, Serial No. 244,235

6 Claims. (Cl. 119—156)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government of the United States of America for governmental purposes without the payment to me of any royalty thereon.

I hereby dedicate the invention herein described to the free use of the people in the territory of the United States.

This invention relates to fly traps and it is more particularly concerned with a device for dislodging and trapping flies and other insects from livestock such as cows, horses and so forth.

An object of this invention is to provide a strong and durable structure, which is inexpensive to manufacture and install, and through which a large number of animals may pass in a short time for the purpose of freeing themselves of flies and other insects.

Other objects of this invention are to provide a simple and efficient means of removing flies and other insects from livestock; to provide novel trapping compartments which will entrap the flies and other insects dislodged from the animals; and in general to provide a device of the type mentioned which is adaptable to any farm, dairy, or range condition and which may be so located that the animals to be treated must pass through it on their way to and from the barn, corral, water, feed yard, salt-lick, or other places frequented by them.

The following description considered together with the accompanying drawings will disclose this invention more fully, its construction, arrangements, and combinations of parts and further objects and advantages thereof will be apparent.

Figure 1:
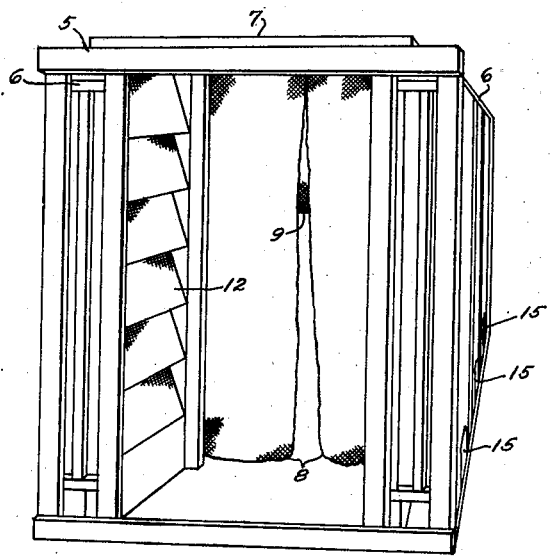
Figure 1 is a front perspective view of an illustrative embodiment of this invention.
Figure 2:
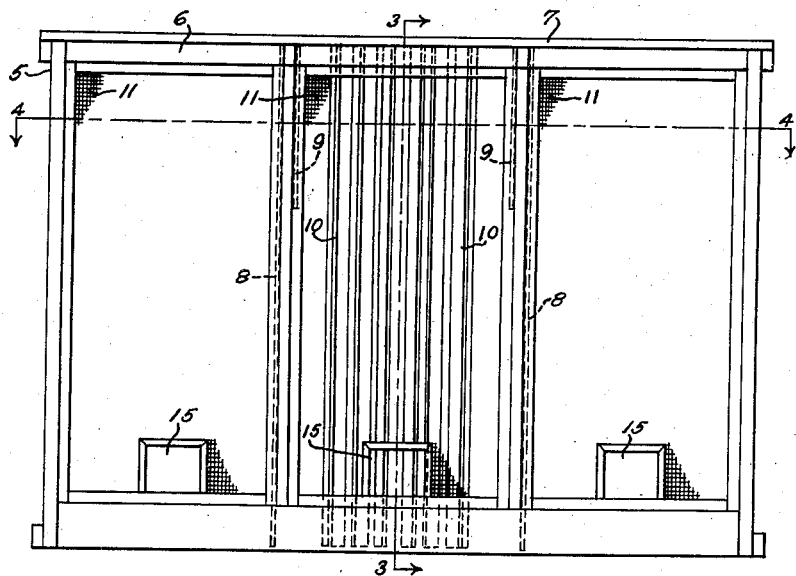
Figure 2 is a side elevational view of the embodiment shown in Figure 1.
Figure 3:
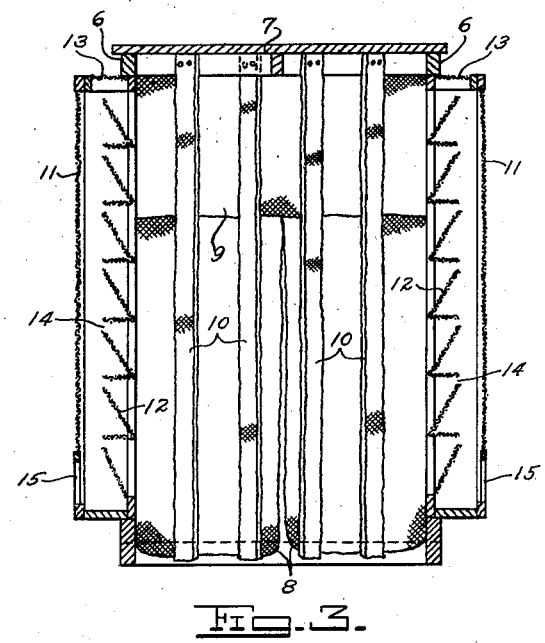
Figure 3 is a section along the line 3—3 of Figure 2.
Figure 4:
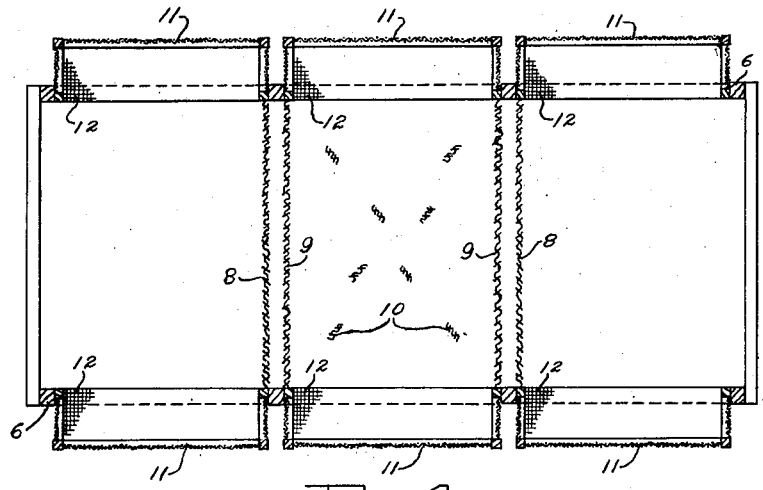
Figure 4 is a section along the line 4—4 of Figure 2.

Referring with more particularity to the drawings in which like numerals designate like parts, the device illustrated comprises a frame or housing 5 having side walls 6, 6 and an opaque roof 7 secured together by any suitable means forming a passageway or corridor of sufficient size to permit livestock to pass through it in single file from either end to the other. The middle portion of the passageway or corridor is partitioned by means of two sets of long drape curtains 8, 8 suspended from the ceiling of the passageway to near the floor thereof. In addition to the above-mentioned curtains, two sets of short curtains 9, 9 are suspended near the long curtains 8, 8 in the partitioned portion of the passageway. Between these curtains there are also suspended from the top of the passageway weighted strips 10 of canvas, or any other suitable material, preferably from four to six inches in width, but any other suitable width may be used.

The sides 6, 6 of the structure are preferably built up of units, each of which comprises a compartment for luring and trapping the insects. Each of these units is composed of an exterior screen wall 11, an interior zig-zag screen wall 12, and a screen roof 13. The outer vertex of each of the angles of the zig-zag wall has an opening 14 through which the flies enter the trapping compartment. The exterior wall 11 of each compartment is preferably made removable by fastening it to the structure by screws or any other suitable means. In the bottom of the wall 11 a door 15 is disposed for the purpose of removing dead flies and other insects.

The operation of this invention is as follows: The animals enter the device from either end in single file. As they proceed through the passageway they progressively encounter one set of the drape curtains 8, one of the short curtains 9, the weighted strips 10, the next short curtain 9, and finally the second set of drape curtains 8. The long drape curtains dislodge the flies from the sides of the animals and the short curtains dislodge the flies from the back of the animal. The weighted strips flap about the legs and belly of the animal as he walks through the middle section between the curtains and dislodge all flies not dislodged by the curtains. Most of the flies will follow the animal into the middle section between the two sets of curtains. The weighted strips flapping about the animal cause the flies to become disconcerted and to make their way to the greatest light. To do this they must go through the openings 14 of the zig-zag walls thereby becoming entrapped in the spaces or compartments between the zig-zag walls and the exterior walls 11. This operation is more effective after the animal leaves the device because the flies are left between the two sets of curtains which becomes darker by the closure of the long curtains 8, 8, making the luring effect of the light entering through the trapping units more effective. Obviously, many of the flies which become dislodged by the first set of curtains encountered by the animal are subject to trapping in the trapping units located at the end section in the passageway. Since the structure disclosed is symmetrical from one end to the other, it is obvious that it may be used by having the animals enter from either end.

The structure as a whole can be located at any suitable place where livestock must pass, such as in a gateway between fields and so forth.

Having thus described my invention, I claim:

1. A device of the character described comprising a corridor to accommodate the passage of livestock, said corridor having an opaque ceiling and transparent side walls, said side walls being shaped to form a plurality of outwardly converging horizontal V-channels, one above the other, the apex of each channel being open sufficiently to permit the passage of insects to be trapped, a transparent casing on the outside of said walls, yieldable means for partitioning a portion of said passage, and means within said partitioned portion for brushing livestock passing therethrough.

2. A device of the character described comprising a corridor to accommodate the passage of livestock, said corridor having a middle section and two end sections, each of said sections having an opaque ceiling and transparent side walls shaped to form a plurality of outwardly converging horibzontal V-channels, one above the other, the apex of each channel being open sufficiently to permit the passage of insects to be trapped, a transparent casing on the outside of said wall, draped curtains for yieldably partitioning said middle section from end sections, and weighted strips suspended from the ceiling of said middle section for brushing livestock passing therethrough.

3. In a structure for trapping flying insects, a corridor to accommodate the passage of livestock, said corridor having an opaque ceiling and transparent walls, said transparent walls consisting entirely of insect traps, a middle section in said corridor partitioned from the end sections of the corridor by draped curtains, and weighted strips suspended within said middle section for brushing the insects off the livestock as they pass therethrough.

4. In a structure for trapping flying insects having a corridor to accommodate the passage of livestock, the improvement comprising an opaque ceiling and transparent walls for said corridor, said walls being formed of horizontal outwardly converging V-channels having openings at their apexes sufficiently large for the passage of insects to be trapped, transparent casings about the exterior of said walls, a middle section in said corridor partitioned from the end sections of the corridor by drape curtains, and weighted strips suspended within said middle section for brushing insects off the livestock as they pass therethrough.

5. In a structure for trapping insects, a corridor to accommodate the passage of livestock, said corridor having an opaque ceiling and transparent walls, said walls comprising a plurality of horizontal outwardly converging V-shaped channels of mesh screen, said channels having openings at the apexes thereof to permit the passage of insects to be trapped, casings of mesh screen about the exterior of said walls, said corridor having a middle compartment and two end compartments, drape curtains partitioning said middle compartment from said end compartments, and means within said middle compartment for brushing insects off the livestock as they pass therethrough.

6. In a structure for trapping insects, a corridor to accommodate the passage of livestock, said corridor having an opaque ceiling and vertically zigzagged mesh screen walls, passageways at the outer apexes thereof to permit the passage of insects to be trapped, casings of mesh screen about the exterior of said walls, said corridor having a middle compartment and two end compartments, drape curtains for partitioning said middle compartment from said end compartments, and means within said middle compartment for brushing insects off the livestock as they pass therethrough.

WESLEY GORDON BRUCE.